United States Patent
Yang et al.

(10) Patent No.: US 7,702,097 B2
(45) Date of Patent: Apr. 20, 2010

(54) METHOD AND APPARATUS FOR AUTHENTICATION OF DATA USING DIFFERENT HASH FUNCTIONS AND FEEDBACK

(75) Inventors: Fan Yang, Helsinki (FI); Tero Koskivirta, Espoo (FI); Timo Knuutila, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 1351 days.

(21) Appl. No.: 10/640,306

(22) Filed: Aug. 14, 2003

(65) Prior Publication Data

US 2004/0236695 A1 Nov. 25, 2004

(30) Foreign Application Priority Data

May 22, 2003 (GB) ................................. 0311857.7

(51) Int. Cl.
*H04K 1/00* (2006.01)
*H04L 9/00* (2006.01)
*H04L 9/20* (2006.01)

(52) U.S. Cl. ........................................................ 380/28
(58) Field of Classification Search ..................... 380/28
See application file for complete search history.

(56) References Cited

U.S. PATENT DOCUMENTS

| 4,275,265 A | * | 6/1981 | Davida et al. ................. 380/29 |
| 2002/0034300 A1 | * | 3/2002 | Thuvesholmen et al. .... 380/256 |
| 2002/0191792 A1 | * | 12/2002 | Anand ......................... 380/255 |

OTHER PUBLICATIONS

Amir Herzberg, Tolerant Combiners: Resilient Cryptographic Design, Aug. 2002, Computer Science Department, Bar Ilan University.*
"Applied cryptography" B. Schneier, Section 9.13 Block Ciphers versus Stream Ciphers.*

* cited by examiner

*Primary Examiner*—Christian LaForgia
*Assistant Examiner*—Harris C Wang
(74) *Attorney, Agent, or Firm*—Squire, Sanders & Dempsey L.L.P.

(57) ABSTRACT

A method and apparatus for authentication of data includes inputting of data into a first layer of a hashing function for rotation based hashing, then inputting results from the first layer to a second layer of the hashing function for substitution based hashing. Feedback is provided from the second layer to the first layer and digests are output from the first and second layers.

20 Claims, 3 Drawing Sheets

METHOD AND APPARATUS FOR AUTHENTICATION OF DATA USING DIFFERENT HASH FUNCTIONS AND FEEDBACK

BACKGROUND OF THE INVENTION

1. Field of the Invention

The present invention relates to data security, and more particularly to authentication of data. Data may need to be authenticated, for example, for securing it against attacks during transmission or transportation over a data network. Authentication may also be required when data is stored in a database that is accessible by users who may not be authorized to access the data.

2. Description of the Related Art

Data security can be provided by means of encryption and ciphering. The purpose of these functions is to shield data so that unauthorized users cannot read the content of the data. Another security feature is known as authentication. The authentication functions are for verifying that the data is authentic, for example, that the data is correct and has not been altered by unauthorized parties.

Authentication can be provided, for example, by means of hashing. The hashing may sometimes be referred to by the term signing. A hash function generates an output known as the digests. The results, i.e. the digests, can then be used to authenticate data. In a possible operation, a sender of data uses a hash function to generate data-related digests. The digests are then sent along with the data. Before using the data, a receiver may then first authenticate it based on the digest. That is, the receiver ensures that the received data is correct. In order to do so, the receiver may use the same hash function as the sender to hash the data and to get the data-related digests. The receiver may then compare the hashed digests with the received digests. If they are the same, then data is correct.

Hash functions are used in various applications. For example, hashing can be used to authenticate data in communication and to generate session keys. Another example is the use of hashing to hash a password. The digests may be used such that in the login the system, for example a computer or a network, hashes the password and compares the digests with the digests stored in the system. Even if an attacker could catch the digests, the attacker would still need to find a way to break the digests.

Examples of conventional hashing algorithms include various versions of algorithms known by the names SHA and MD5. Both MD5 and SHA hash messages to produce message related digests. The conventional hash functions only support a fixed length of digest. For example, SHA-1 can only generate a 160-bit digest. One SHA-2 implementation can only generate a 256-bit digest, a 384-bit digest or a 512-bit digest. That is, an SHA-2 implementation can still generate only a fixed length digest.

A number of data processing applications use SHA-1 as the authentication function. Should the SHA-1 be broken into by an attacker, then all of those applications would need to be updated or even re-implemented. This may cause a lot of trouble. An entirely new authentication implementation may be needed, including a lot of coding and debugging. The hash functions are typically categorised as security issues, and thus new codes cannot usually be downloaded from open networks or from free areas, as there is a risk, for example, that the code contains "Backdoors". Furthermore, a variety of platforms exists and the coding has to be platform-specific. Finally, the new hash implementation has to be installed. The installation may need to be done in a number of locations. User may need to be trained for the new hash functions, and so on.

This extensive amount of extra work might be avoided were it possible to extend the digest. Extendable digests might be useful since it might enable addressing the situation where the initial short digest is broken by extending the initial digests rather than updating or replacing the entire algorithm.

SUMMARY OF THE INVENTION

According to one aspect of the present invention, there is provided a method for authentication of data, the method comprises inputting data into a first layer of a hashing function for rotation based hashing, then inputting results from the first layer to a second layer of the hashing function for substitution based hashing. This embodiment of the invention then includes providing feedback from the second layer to the first layer, and outputting digests from the first and second layers.

According to another aspect of the present invention there is provided a data processing device configured to execute a data authentication procedure. The data processing device comprises data processing means configured to provide a hashing function, the hashing function being divided into hashing layers such that a first layer is for rotation based hashing and a second layer is for substitution based hashing. The first layer comprises first input for receiving data to be processed, a second input for receiving data from the second layer, a first output for outputting digests and a second output for communication of data to the second layer. The second layer comprises a third input for receiving data from the first layer, a third output for outputting digests and a fourth output for communication of data to the first layer.

In more detailed embodiments, Fast Fourier Transform may be applied on the data at the first layer. Substitution may be applied at the second layer on data received from the first layer.

The length of the digest produced by the hashing function may be changed by reconfiguring the hashing function. The reconfiguration may comprise changing the number of digests.

The embodiments of the invention may provide a feasible manner to extend the length of a digest. The extension may not require substantially more processing capacity. The embodiments may enable stream like hashing of individual words instead of hashing entire messages.

BRIEF DESCRIPTION OF DRAWINGS

For better understanding of the present invention, reference will now be made by way of example to the accompanying drawings, in which.

DESCRIPTION OF PREFERRED EMBODIMENTS

Figure 1:
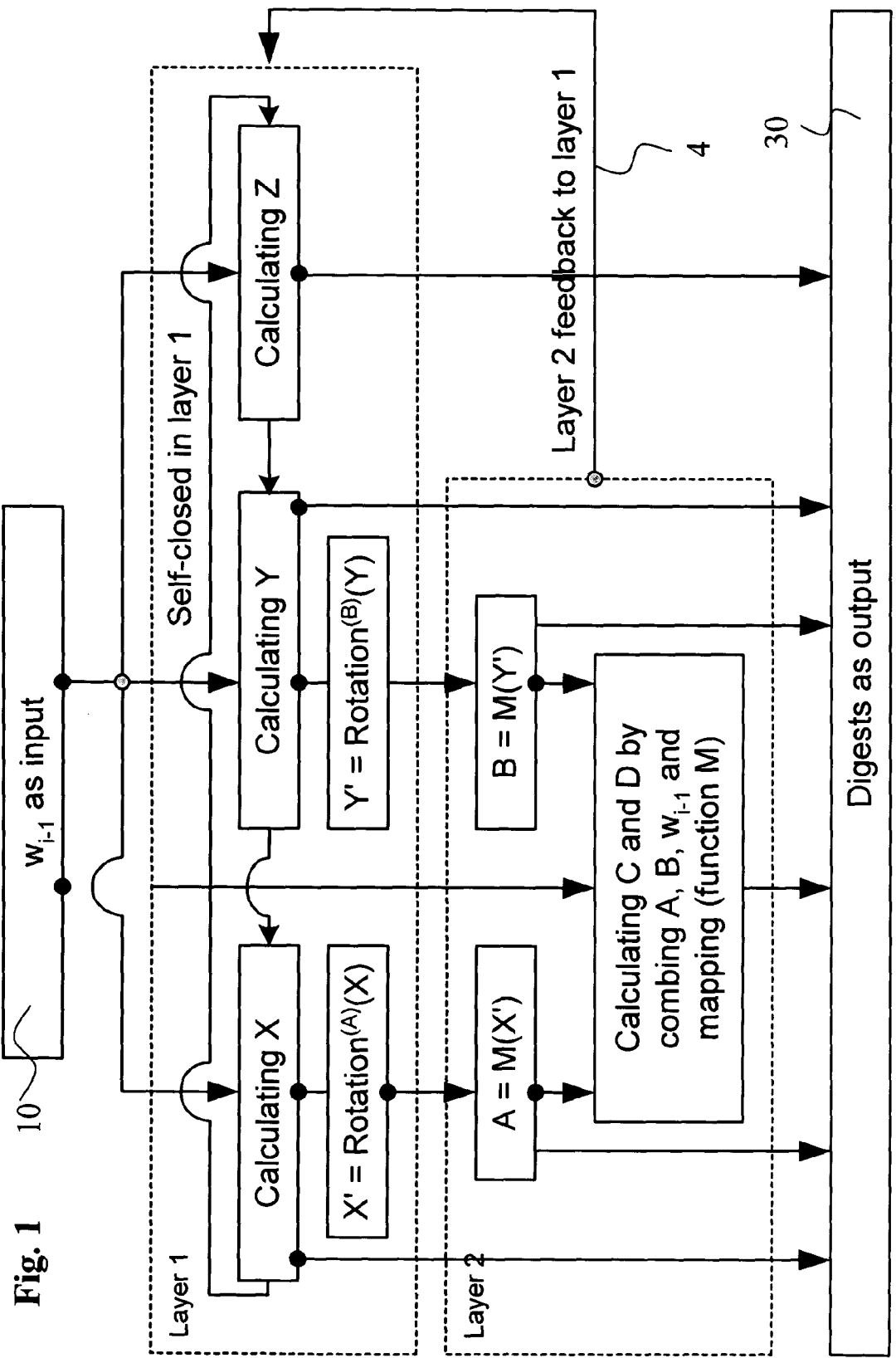
FIG. 1 shows one embodiment of the present invention.

One example of a preferred data authentication algorithm will be referenced to in the following as the Cyclically Closed Chain Hash Algorithm (CCCHA). The algorithm is denominated 'Cyclically Closed Chain Hash Algorithm' since the basic structure of the hashing algorithm is cyclically closed, i.e. looped. FIG. 1 shows a possible layered design for implementation of such cyclically closed algorithm in accordance with the present invention.

Unlike conventional block-based hash functions, the CCCHA can be described as being a word or stream-based hash function. That is, each word of a message may be signed individually. Each word of the message may also be sequentially processed. Thus, unlike the block-based hashes, the input may be treated as a sequence of words.

The hashing is cyclically closed, i.e. looped. The loop starts from a group of constant numbers and also ends at the same constant numbers. Thus, the hash is closed from a predictable start to a predictable end. A purpose of this is to enhance the predictability. This is believed to be advantageous since the attackers cannot change the beginning and the end of the cycle.

Figure 2:
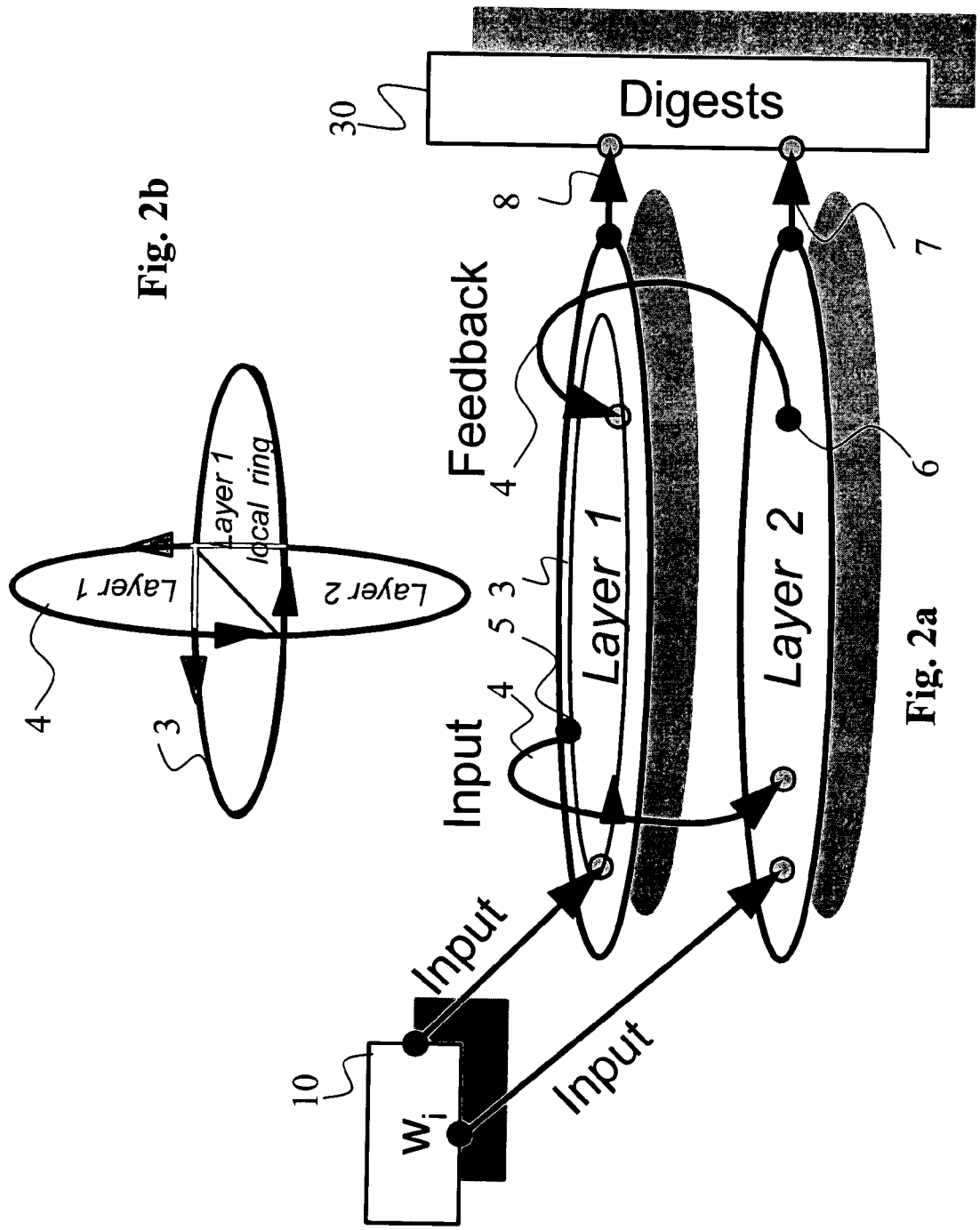
FIGS. 2a and 2b show a cyclical hashing arrangement in accordance with an embodiment.

FIG. 1 shows in more detail how hashing can be divided into two layers 1 and 2 and how digests may be collected from layers 1 and 2. FIGS. 2a and 2b show the three-dimensional architecture of the closed cycles.

As shown in FIGS. 1 and 2a, the hashing may be provided on two layers 1 and 2 to hash each word in the stream of words. The words may be input sequentially into the hashing function. The input 10 is first processed at layer 1. The hashing on layer 1 may be based on any rotational hash, such as rotational FFT-like (Fast Fourier Transform) hash. Use of FFT-like methods on layer 1 makes it difficult for an attacker to predict the output from the input of layer 1.

However, FFT alone is weak against attacks that are based on retransformation, i.e. predicting input from the output. A retransformation exists for each transformation, and therefore the FFT is vulnerable for attacks as a collision is possible to be predicted from the digests. For example, this may be done by finding a collision in f-domain and inverting back through retransformation.

The output of layer 1 is then taken as input at layer 2, at step 104. Layer 2 uses a substitution based hash which makes it difficult for an attacker to predict the input from the output of layer 2. Therefore the substitution can be used to close the possibility of retransformation. However, substitution alone is weak against attacks that are based on differential cryptanalysis, i.e. predicting the output from the input.

In the shown embodiment layers 1 and 2 provide a mutual i.e. integrated protection against these weaknesses by means of the input of results from layer 1 to layer 22 and the subsequent feedback arrangement from layer 2 to layer 1. The purpose of using the layers is to hide the weaknesses of the hashing methods in the middle of the model. This means that the attackers face the strong points of these two methods.

However, use of layers alone may not be enough. Even when hidden in the middle of the model, the weaknesses may still settle at a fixed point. An attacker may try to indirectly attack those weaknesses. The purpose of the cyclical design is to move the weaknesses from the fixed points and to distribute them evenly. These cycles will be called in the following as rings. In this regards an analogy can be drawn to a rotating log which is much more difficult to attack than a static log.

The rotational closed rings can be used to spread any of deviations caused by some distorted words to all parts of the digests through the closed rings. A further purpose of the rings is to hash each word in a distributed manner so that the input can always be a single word in each time while the final output is block-like.

The distribution of the points around the word may be accomplished by calculating two closed rings. Two such rotating rings 3 and 4 are shown in FIG. 2b. One of the rings may be from the beginning to the end of a message or any other string of words. The other ring may then be for each word itself. The two closed rings can be used to generate integrated digests. Digests may then be obtained from the points on the two closed rings.

A larger diameter of the rings provides more points and hence may generate a longer digest. The calculations may become more straightforward since the messages may be treated as word streams.

In the example of FIG. 2b, the ring 3 is shown to be horizontal. The other ring 4 is shown to be vertical. As shown in FIG. 2a, the vertical ring 4 rotates such that it provides input 5 for layer 2 by from layer 1 to layer 2 and then feeds back results 6 of layer 2 hashing to layer 1. The horizontal ring associates with layer 1, i.e. may only be applied to data at layer 1. The horizontal ring 3 may be designed to mainly perform a rotation-based addition.

Figure 3:
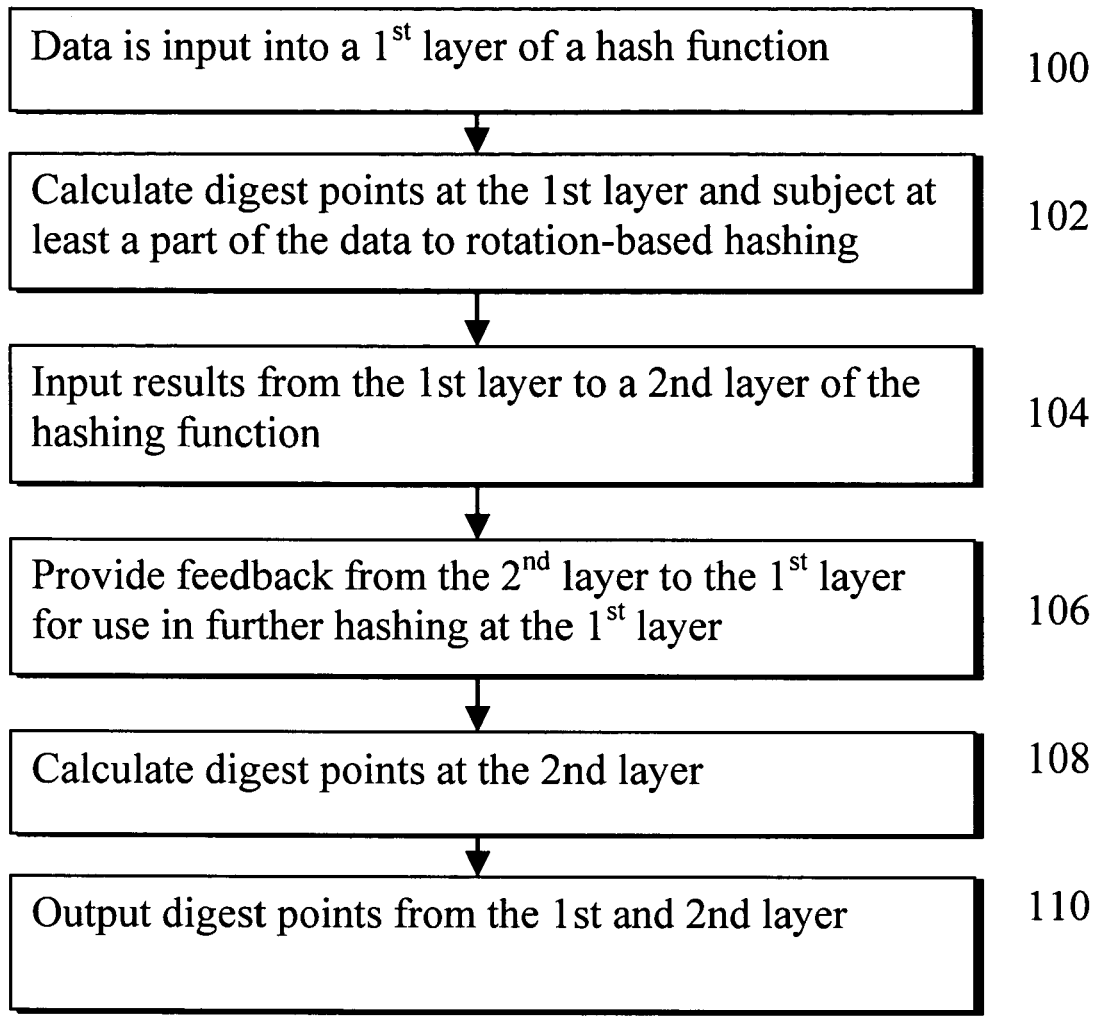
FIG. 3 is a flowchart illustrating the operation of one embodiment of the present invention.

More particularly, and as shown in FIG. 3, user data 10, $w_{i-1}$, is input into layer 1 at step 100 for hashing at step 102. At least some of the hashed results 5 of layer 1 are then input into layer 2 at step 104. The hashed results 6 of layer 2 are oppositely feedback to layer 1 at step 106. This forms the vertically closed ring 4 between the two layers 1 and 2. Meanwhile, the horizontally closed ring 3 is constructed by calculating $X_i$ with $Y_{i-1}$, calculating $Y_i$ with $Z_{i-1}$ and calculating $Z_i$ with $X_{i-1}$. Since the horizontal ring 3 offsets its bit order, the whole space is rotating. A more detailed example of possible calculations is given later.

As shown in FIGS. 1 and 2a, both layers provide digests 7 and 8 at the output 30, see also steps 108 and 110 of FIG. 3.

Layer 1 may be configured to mainly take rotation and summation operations, such as an FFT-like (Fast Fourier Transformation) hash. For example, Fast Fourier Transformation, $X(m)=\Sigma x(n)R^{mn}$ could be used and compared with $\Sigma \text{Rotation}^{(A)}(X(n))$. It shall be appreciated that the rotation functions applied in layer 1 can be much more complicated than a simple rotation used in the FFT.

Layer 2, in turn, may use a substitution-based hash. The purpose of layer 2 is preferably to cut off the possibility that a collision is predictable from the retransformation.

Functions Rotation$^{(A)}$ and Rotation$^{(B)}$ are shown in layer 1 and a mapping function (M) is shown on layer 2. Because of inconsistent rotations, finding differential relations among X, Y and Z becomes very difficult. This is because the different functions belong to different layers.

The following is a more detailed example of the possible computations. As mentioned above, the message to be processed is treated as a word stream. Thus, a message can be seen as $w_0, \ldots, w_{n-1}$. Each word has a fixed length of w bits. In 32/64-bit system, this would mean w=32/64 bits, respectively. The length of messages can be the multiple of w. Hence message padding maximally adds w/8-1 bytes. Like in conventional hash functions, the first bit of padding may be set to '1' and the rest can be set to '0'. Some additional padding may be required. Two words may be used to record the bit length of messages. This implies that the maximal length of messages is $2^{2w}$ bits. For example, if the message is "123" then the bit length of the message would be 24 bits. After this two words of pre-defined constant numbers may be padded.

The hash starts from a group of pre-defined constant numbers. $H_t$ is assigned to the constant numbers in the initial time. The above mentioned last two words of padded messages are pre-defined constant numbers. The hash will then also end by hashing two constant numbers. Thus, a closed chain along the direction of the word stream is constructed as the chain is closed at these constant/static numbers. Two closed rings is then used to hash each word.

Two basic functions are used for the hashing, rotation-based addition and mapping. The addition utilizes cycle-offset functions, which can be defined as $$ROTL^n(x) = (x<<n) \vee (x>>(w-n))$$

Or $$ROTR^n(x) = (x>>n) \vee (x<<(w-n)),$$

where $0 \leq n \leq w$, and
$\vee$ denotes bitwise OR.

These two cycle-offset functions are used to construct two rotation-based addition functions, namely
Rotation$^{(A)}$(x), and
Rotation$^{(B)}$(x).

When w=32 bits, Rotation$^{(A)}$(x) and Rotation$^{(B)}$(x) can respectively be defined as $$\text{Rotation}^{(A)}(x) = x + ROTL^9(x) + ROTL^{21}(x) + ROTL^{30}(x \wedge 0x03030303) + ROTR^9(x) + ROTR^{21}(x) + ROTR^{30}(x \wedge 0x30303030).$$

$$\text{Rotation}^{(B)}(x) = x + ROTL^{10}(x) + ROTL^{19}(x) + ROTL^{29}(x \wedge 0x07070707) + ROTR^{10}(x) + ROTR^{19}(x) + ROTR^{29}(x \wedge 0x70707070).$$

In the above equitation $\wedge$ denotes bitwise AND.

When w=64 bits, Rotation$^{(A)}$(x) and Rotation$^{(B)}$(x) can be defined as $$\text{Rotation}^{(A)}(x) = x + ROTL^9(x) + ROTL^{21}(x) + ROTL^{30}(x) + ROTL^{36}(x) + ROTL^{41}(x) + ROTL^{48}(x) + ROTL^{60}(x \wedge 0x0f0f0f0f0f0f0f0f) + ROTR^9(x) + ROTR^{21}(x) + ROTR^{30}(x) + ROTR^{36}(x) + ROTR^{41}(x) + ROTR^{48}(x) + ROTR^{60}(x \wedge 0xf0f0f0f0f0f0f0f0)$$

$$\text{Rotation}^{(B)}(x) = x + ROTL^{10}(x) + ROTL^{19}(x) + ROTL^{29}(x) + ROTL^{35}(x) + ROTL^{40}(x) + ROTL^{47}(x) + ROTL^{59}(x \wedge 0x1f1f1f1f1f1f1f1f) + ROTR^{10}(x) + ROTR^{19}(x) + ROTR^{29}(x) + ROTR^{35}(x) + ROTR^{40}(x) + ROTR^{47}(x) + ROTR^{59}(x \wedge 0xf1f1f1f1f1f1f1f1)$$

The mapping functions are defined in such a way that an 8-bit value or two 8-bit (i.e., a 16-bit value but used as two 8-bit values) values is substituted by an entry value of either $S^1$ or $S^2$, respectively. For example, if one considers an 8-bit value $v_8$ and two of 8-bit values $v_{8(0)}$ and $v_{8(1)}$, then substitution value $s_8 = S^1[v_8]$ and $s_{16} = S^2[v_{8(0)} + v_{8(1)}]$. A w-size variable may firstly be converted into 8-bit stream and then substituted by $S^1$ or $S^2$ with the above logic. For example, $s_8$ may be used when w=32 bits and $s_{16}$ when w=64 bits. in other words, a 64-bit word may be substituted by 4 of $s_{16}$ values and a 32-bit word may be substituted by 4 of $s_8$ values.

The hashing algorithm hashes each word of a message. The results are then directly put into the digest. In the other words, instead of block-based hash, a stream-based hash is performed. In hashing each word, operations are divided into two parts i.e. the layers explained above. Layer 1 forms a rotation-based hash and layer 2 forms a substitution-based hash.

The basic logic of the layers 1 and 2 of this example is as follows. Set three variables X, Y and Z. Also, set two loop variables i and j that respectively range from 1 to n and from 1 to w−1. Three or four working variables A, B, C and D and a temporary variable T are also needed. X, Y and Z are assigned to the constant numbers in the initial time.

Layer 1:
T=X
X=Y+ROTL$^j$(w$_{i-1}$)
Y=Z+w$_{i-1}$
Z=T+w$_{i-1}$
A=Rotation$^{(A)}$(X)
B=Rotation$^{(B)}$(Y)

Layer 2 (for Digest Lengths of 160 to 224 and 384 to 448):
A=Map(A)
B=Map(B)
C=Map(w$_{i-1}$⊕(A+B))
D=Map(w$_{i-1}$⊕B)

Layer 2 for digest lengths of 256 to 352 would be otherwise the same except that
C=Map(w$_{i-1}$⊕A), and
D is not calculated.

The calculations for generation of the digest may take a bit different logic, depending on the length of the digest. Four different exemplifying logics are described below.

Digest length 160-to-224 (in the following CCCHA 160-to-224) may be processed based on the 32-bit system. 160-bit, 192-bit, 224-bit digests may be generated. The generation of digests is shown below.

$$H_0 = H_0 + A$$

$$H_1 = H_1 + B$$

$$H_2 = H_2 + C$$

$$H_3 = H_3 + (\neg A) \oplus (\neg B) \oplus (\neg C)$$

Note: substituted results are feed back at this stage $$X = H_4 = X \oplus ROTL^{12}(A+B)$$

$$Y = H_5 = Y \oplus ROTL^{12}(B+C)$$

$$Z = H_6 = Z \oplus ROTL^{12}(C+A)$$

After hashing all the words in stream $w_0, \ldots, w_{n-1}$, the final outputs of digest follow the list below.
CCCHA-160: $H_0, H_1, H_2, H_4, H_5$
CCCHA-192: $H_0, H_1, H_2, H_4, H_5, H_6$
CCCHA-224: $H_0, H_1, H_2, H_3, H_4, H_5, H_6$ Raw ciphertext corresponding to $w_i$ (notice the next one to $w_{i-1}$, which is being hashed) can be generated by $$\text{ciphertext}_i = \text{ciphertext}_{i-1} + ((A+B+C) \oplus w_i) + H_3$$

Note that the ciphertext$_{-1}$ may be assigned to a constant number in the initial time. The generation and use of the ciphertext will be described in more detail later in this specification.

CCCHA-256-to-352 can generate 256-bit, 288-bit, 320-bit and 352-bit digests. The generation of the digests is shown below.

$$H_0 = H_0 + A$$

$$H_1 = H_1 + B$$

$$H_2 = H_2 + C$$

$$H_3 = H_3 + D$$

$$H_4 = H_4 + (A \oplus D)$$

$$H_5 = H_5 + (B \oplus C)$$

$$H_6 = H_6 + (A \oplus (\neg C)) + (B \oplus (\neg D))$$

$$X = H_7 = X \oplus ROTL^{12}(A+B+C)$$

$$Y = H_8 = Y \oplus ROTL^{12}(B+C+D)$$

$$Z = H_9 = Z \oplus ROTL^{12}(C+D+A)$$

$$H_{10} = X+Y+Z$$

After hashing, outputs of the digests follow the list below.
CCCHA-256: $H_0, H_1, H_2, H_3, H_6, H_7, H_8, H_9$
CCCHA-288: $H_0, H_1, H_2, H_3, H_4, H_6, H_7, H_8, H_9$
CCCHA-320: $H_0, H_1, H_2, H_3, H_4, H_5, H_6, H_7, H_8, H_9$
CCCHA-352: $H_0, H_1, H_2, H_3, H_4, H_5, H_6, H_7, H_8, H_9, H_{10}$
Raw ciphertext corresponding to $w_i$ can be generated by $$ciphertext_i = ciphertext_{i-1} + ((A+B+C+D) \oplus w_i) + H_6$$

CCCHA-384-to-448 takes similar logic as CCCHA-160-to-224. The difference is that the former is based on 64-bit system and that $$X = H_4 = X \oplus ROTL^{20}(A+B)$$

$$Y = H_5 = Y \oplus ROTL^{20}(B+C)$$

$$Z = H_6 = Z \oplus ROTL^{20}(C+A).$$

Output orders are listed below.
CCCHA-384: $H_0, H_1, H_2, H_4, H_5, H_6$.
CCCHA-448: $H_0, H_1, H_2, H_3, H_4, H_5, H_6$.
Raw ciphertext corresponding to $w_i$ can be generated by $$ciphertext_i = ciphertext_{i-1} + ((A+B+C) \oplus w_i) + H_3$$

CCCHA-512-to-640 takes similar logic as CCCHA-256-to-352. The difference is that the former is based on 64-bit system and unlike CCCHA-250-to-352, it does not need to calculate $H_{10} = X+Y+Z$. Also, $$X = H_7 = X \oplus ROTL^{20}(A+B+C)$$

$$Y = H_8 = Y \oplus ROTL^{20}(B+C+D)$$

$$Z = H_9 = Z \oplus ROTL^{20}(C+D+A).$$

The output orders are listed below.
CCCHA-512: $H_0, H_1, H_2, H_3, H_6, H_7, H_8, H_9$.
CCCHA-576: $H_0, H_1, H_2, H_3, H_4, H_6, H_7, H_8, H_9$.
CCCHA-640: $H_0, H_1, H_2, H_3, H_4, H_5, H_6, H_7, H_8, H_9$.
Raw ciphertext corresponding to $w_i$ can be generated by $$ciphertext_i = ciphertext_{i-1} + ((A+B+C+D) \oplus w_i) + H_6$$

As the inputs are mixed, the hashed results on each word are evenly distributed on the closed rings. Therefore, all points on the closed rings can be output as a part of the digests. If we use the CCCHA-160-to-224 above as an example, six independent points X, Y, Z, A, B and C would result. In addition, intersections of A, B and C can be used as extensions. The other applications, such as CCCHA-256-to-352 and so on provide even more intersections that can be used as extensions.

Even when intersections of A, B and C are used as extensions, some potential extension capacity is still available because more intersections can be used as extension. For example, in CCCHA-160-to-224, the intersections of A, B and C are only used. It is possible to utilize the intersections of AB, BC and CA as well as the intersections among X, Y and Z as extensions.

Use of closed rings makes extension of the digest possible by simply changing the configuration of the rings. That is, different lengths of digests may be produced. In order to generate a longer digest, the only thing needed is to enlarge the diameter of the closed rings. That can be done by adding some new points into the closed rings. Such extension may be provided by simply changing settings of the configuration. Thus it is possible to easily generate a longer digest if the shorter one was broken and still use the basic signing implementation.

Changing the configuration of rings may be done by switch-case operations. For example, in the above examples the operations could be:

```
switch (configuration) {
    case 160:
        then calculating H0, H1, H2, H4 and H5;
    case 192:
        then calculating H0, H1, H2, H4, H5 and H6;
    ...
}
```

Enlarging the diameter of closed ring does not add any substantial overhead for the processing. Thus the embodiments can be used to generate different digest lengths and the overhead is not clearly increased. This is because some middle information generated during hashing can be directly used as digests, see FIG. 1.

An advantage provided by the embodiments is the integrity of the hash algorithm. This can be illustrated by the following example. Lets assume hashing of a 1-word variable 'x' to generate a 5-word digests A, B, C, D, E at the ith step of the algorithm of FIG. 1. If the relationship among the digests A, B, C, D, E were loose then attackers might be able to break A at the ith step, break B at the jth step and so forth. This can be avoided by generating one n-word digest is generated instead of n word-sized digests. By means of this it is possible to improve the strength of the hash function. The two closed rings may be used in hashing each word in thus manner. As shown in FIG. 2b, one ring may be vertical, going along the direction of input down to output and then feeding back up to the input. The other ring may then be horizontal, circularly rotating among some of the working variables.

The embodiments may combine different hashes, for example an FFT-like hash and a S-box-like hash. The conventional hash functions have been block-based which has made it difficult to share common operations between hash and encryption stages. The common operations might, however, be advantageous in ciphersuit applications, such as in session-based secrecy.

The above described cyclically closed hash algorithm also supports integration of hash and encryption, thus providing a stream-based hash function with a built-in a cipher. That is, when a message is input into the hash algorithm, it is possible to obtain ciphertexts in addition to the digests. The hash function may also be used for key derivation and then use a fairly simple model to encrypt messages. Thus, integration of hash and encryption basically adds a very limited amount of operations. It is also possible to use the hash algorithm as a pure encryption function. Namely, the hash logic can only be used for key derivation. The encryption also offers support of variable length of key. The stream like hashing is advantageous since it enables the dual functionality of hash and encryption. The combined hash and encryption is preferably applied in symmetric systems.

An additional randomizing logic may be provided which extends the hashing space so that from the resulting digest point of view there is no difference between word-based and block-based treatment. The advantage of the word-based treatment is that the hashed results in each word can be directly used as half-finished products for encrypting. Ciphersuit applications can seamlessly integrate hash and encryption phases, thus avoiding duplicate calculation. This combination may be substantially faster than, for example, the corresponding SHA+AES combination.

The above describes the core elements of the hash function. The described additional features can then be extended based on the hashing.

In an embodiment the task of hash functions is to hash an entire message rather than individual words of the message. Even if the aim is to hash message the detailed operations may still be on each word. The two closed rings used in word hashing can be used to guarantee the integrity of the hashing of the message.

It is noted that although the above disclosed solution wherein two closed rings are provided, only one ring may be enough in certain applications. if only one ring is used, it is still possible to spread any possible deviations from a point to others. However, the spreading speed is believed to be slower than in applications with two rings. Although workable, use of spreading deviation only might not be enough for all applications. Even distribution of the deviations might be required so that the deviations are difficult to be rejected later. Addition of the horizontal ring can speed up spreading and make the even distribution of deviations faster.

The following describes yet another embodiment which might be used in certain applications together with the above described hash function. Conventional hashing algorithms can be seen as static operations since the digests will always be the same as long as the inputs are identical. That may cause problems in security if the inputs remain the same or if the changes are not substantial. This may become an even more acute problem since the hacking applications are getting more sophisticated and "stronger". For example, the conventional hashing algorithms may be vulnerable if so called Birthday attacks and other brute-force attacks are combined to apply on the signing algorithms. A further embodiment may provide further protection against the risks caused by the static nature of the conventional algorithms. In this further embodiment a group of changeable initial values may be used to prevent the risk of successful attacks. More particularly, the hash algorithm may utilize changeable initial values to enhance the dynamics of the data signing so that the risk of successful Birthday attacks or similar brute-force attacks can be reduced. The changeable initial values can be used to enhance the strength of the hashing by enlarging the space with an environmental variable. The changeable initial values may have a certain period. For example, the changeable initial values may have a period of 232. The digests may be distributed with the changeable initial values. Thus, even though attackers might find some repetitions through some integrated attack, they would fail to subdue the algorithm. This is so since the attackers would only have a chance when a combination of identical initial values and a message reappear again. This requirement is believed to be extremely difficult to meet.

In data security applications, each level of protection makes it more difficult to attack the data. The changeable initial values are based on a difficulty that attackers might try to solve making a collision for purpose. However, the attackers cannot duplicate a collision if the environment is changed. For example, a message may be sent to a receiver which then verifies the message. If there is a concern regarding the reliability of the hash function, for example if the message is very important or the used digest is not very long. If changeable initial values is also applied in the hash function, then the receiver may ask the sender to confirm the message with a different group of initial values. If confirmed for n times, then the difficulty exponentially increases with n.

It is also noted herein that while the above describes exemplifying embodiments of the invention, there are several variations and modifications which may be made to the disclosed solution without departing from the scope of the present invention as defined in the appended claims.

The invention claimed is:

1. A method for outputting digests from a sender to a receiver for data authentication, the method comprising:
   inputting, by a processor, data into a first layer of a hashing function for rotation based hashing;
   inputting, by the processor, results from the first layer to a second layer of the hashing function for substitution based hashing;
   providing, by the processor, feedback from the second layer to the first layer; and
   outputting, by the processor, digests, corresponding to the data, directly from the first layer to the receiver and directly from the second layer to the receiver for data authentication.

2. The method of claim 1, further comprising:
   applying fast Fourier transform on the data at the first layer.

3. The method of claim 1, further comprising:
   applying substitution at the second layer on data received from the first layer.

4. The method of claim 1, further comprising:
   changing a length of a digest of the hashing function by reconfiguring the hashing function.

5. The method of claim 4, wherein the reconfiguring comprises changing a number of digests used by the hashing algorithm.

6. The method of claim 4, wherein the changing comprises performing switch-case operations to change the length of the digest.

7. The method of claim 4, wherein the changing comprises increasing the length of the digest.

8. The method of claim 1, further comprising:
   inputting individual words of a message into the first layer of the hashing function and hashing the message as a stream of words.

9. The method of claim 1, further comprising:
   encrypting data by the hashing function.

10. A computer program embodied on a computer readable medium, said computer program configured to control a processor to perform:
    inputting data into a first layer of a hashing function for rotation based hashing;
    inputting results from the first layer to a second layer of the hashing function for substitution based hashing;
    providing feedback from the second layer to the first layer; and
    outputting digests, corresponding to the data, directly from the first layer to the receiver and directly from the second layer to the receiver for data authentication.

11. An apparatus, comprising:
    data processing means for providing a hashing function, the hashing function being divided into hashing layer means comprising first layer means for rotation based hashing and second layer means for substitution based hashing,
    the first layer means comprising first input means for receiving data to be processed, second input means for receiving data from the second layer, first output means for directly outputting digests to a receiver for data authentication, and second output means for communicating data to the second layer, and
    the second layer means comprising third input means for receiving data from the first layer, third output means for directly outputting digests, corresponding to the data, to the receiver for data authentication, and fourth output means for communicating data to the first layer.

12. An apparatus, comprising:
a data processing unit configured to perform a hashing function, the hashing function being divided into hashing layers, the data processing unit comprising
- a first layer configured to perform rotation based hashing, said first layer comprising a first input configured to receive data to be processed, a second input configured to receive data, a first output configured to directly output digests to a receiver for data authentication, and a second output configured to communicate data, and
- a second layer configured to perform substitution based hashing, the second layer comprising a third input configured to receive data from the first layer, a third output configured to directly output digests, corresponding to the data, to the receiver for data authentication, and a fourth output configured to communicate data to the first layer, wherein the second input of the first layer is configured to receive data from the second layer, and the second output of the first layer is configured to communicate data to the second layer.

13. The apparatus of claim 12, wherein the first layer is configured to apply fast fourier transform on the data.

14. The apparatus of claim 12, wherein the second layer is configured to apply substitution on data received from the first layer.

15. The apparatus of claim 12, wherein the data processing unit is configured to change a length of the digest of the hashing function by reconfiguring the hashing function.

16. The apparatus of claim 15, wherein the reconfiguration comprises changing a number of digests used by the hashing algorithm.

17. The apparatus of claim 15, wherein switch-case operations are used when changing the length of the digest.

18. The apparatus of claim 15, wherein the length of the digest is increased.

19. The apparatus of claim 12, wherein the first layer is configured to receive individual words of a message and to hash the message as a stream of words.

20. The apparatus of claim 12, wherein the data processing unit is configured to encrypt data by the hashing function.

* * * * *